US010878556B2

(12) United States Patent
Hestand et al.

(10) Patent No.: US 10,878,556 B2
(45) Date of Patent: Dec. 29, 2020

(54) INTERACTIVE SEMI-AUTOMATED BORESCOPE VIDEO ANALYSIS AND DAMAGE ASSESSMENT SYSTEM AND METHOD OF USE

(71) Applicant: United Technologies Corporation, Farmington, CT (US)

(72) Inventors: Paul D. Hestand, Amesbury, MA (US); Alan Matthew Finn, Hebron, CT (US); Dennis M. Moura, South Windsor, CT (US); Ziyou Xiong, Wethersfield, CT (US); Keith R. Russell, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 405 days.

(21) Appl. No.: 15/875,607

(22) Filed: Jan. 19, 2018

(65) Prior Publication Data
US 2019/0228514 A1    Jul. 25, 2019

(51) Int. Cl.
*G06T 7/00*  (2017.01)
*G06T 7/11*  (2017.01)
(Continued)

(52) U.S. Cl.
CPC ......... *G06T 7/001* (2013.01); *G01N 21/8851* (2013.01); *G01N 21/954* (2013.01);
(Continued)

(58) Field of Classification Search
CPC ... G06T 7/001; G06T 7/62; G06T 7/11; G06T 2207/30164; G01N 21/9515;
(Continued)

(56) References Cited

U.S. PATENT DOCUMENTS 7,689,003 B2   3/2010   Shannon et al.
8,477,154 B2   7/2013   Davis et al.
(Continued)

FOREIGN PATENT DOCUMENTS

WO   WO2012/040533 A1   3/2012

OTHER PUBLICATIONS

Extended European Search Report for EP Application No. 19152104.6, dated May 23, 2019, 7 pages.
(Continued)

*Primary Examiner* — Chan S Park
*Assistant Examiner* — Elisa M Rice
(74) *Attorney, Agent, or Firm* — Kinney & Lange, P.A.

(57) ABSTRACT

A method of assessing damage to a component includes displaying a sensor image of the component in a first viewing pane, displaying a reference image of the component, which is a graphical depiction of the component with accurate dimensions, in a second viewing pane, placing a plurality of first identification markers on the sensor image of the component in the first viewing pane to correspond to a matching location with a second identification marker on the component in the reference image, identifying a region of damage on the component in the sensor image, mapping the region of damage to the component in the reference image using the plurality of first and second identification markers, and calculating a size of the region of damage.

18 Claims, 3 Drawing Sheets

(51) Int. Cl.
    *G01N 21/88*     (2006.01)
    *G06F 16/58*     (2019.01)
    *G01N 21/954*     (2006.01)
    *G01N 21/95*     (2006.01)
    *G06T 7/62*     (2017.01)

(52) U.S. Cl.
    CPC ..... *G01N 21/9515* (2013.01); *G06F 16/5866* (2019.01); *G06T 7/11* (2017.01); *G06T 7/62* (2017.01); *G01N 2021/8874* (2013.01); *G01N 2021/8877* (2013.01); *G06T 2207/30164* (2013.01)

(58) Field of Classification Search
    CPC ............ G01N 21/954; G01N 21/8851; G01N 2021/8874; G01N 2021/8877; G06F 16/5866
    See application file for complete search history.

(56) References Cited

U.S. PATENT DOCUMENTS

| | | |
|---|---|---|
| 8,744,166 B2 | 6/2014 | Scheid et al. |
| 8,761,490 B2 | 6/2014 | Scheid et al. |
| 8,781,209 B2 | 7/2014 | Scheid et al. |
| 8,781,210 B2 | 7/2014 | Scheid et al. |
| 8,792,705 B2 | 7/2014 | Scheid et al. |
| 9,251,582 B2 | 2/2016 | Lim et al. |
| 9,316,564 B2 | 4/2016 | Kobayashi et al. |
| 9,471,057 B2 | 10/2016 | Scheid et al. |
| 9,535,809 B2 | 1/2017 | Soorianarayanan et al. |
| 9,537,907 B2 | 1/2017 | Messinger et al. |
| 9,581,438 B2 | 2/2017 | Messinger et al. |
| 9,588,515 B2 | 3/2017 | Coombs et al. |
| 9,823,460 B2 | 11/2017 | Kobayashi et al. |
| 9,825,092 B2 | 11/2017 | Liu et al. |
| 2013/0207965 A1* | 8/2013 | Hori .................. G01N 21/9515 345/419 |
| 2015/0138342 A1 | 5/2015 | Brdar et al. |
| 2015/0168263 A1* | 6/2015 | Mueller ............... G01N 21/954 348/82 |
| 2015/0350639 A1 | 12/2015 | Maule et al. |
| 2016/0314571 A1 | 10/2016 | Finn et al. |
| 2018/0158183 A1* | 6/2018 | Kobayashi ............. G06T 5/003 |

OTHER PUBLICATIONS

Communication Pursuant to Article 94(3) EPC for EP Application No. 19152104.6, dated Feb. 14, 2020, 3 pages.
Communication Pursuant to Article 94(3) EPC for EP Application No. 19152104.6, dated Sep. 18, 2020, 3 pages.

* cited by examiner

INTERACTIVE SEMI-AUTOMATED BORESCOPE VIDEO ANALYSIS AND DAMAGE ASSESSMENT SYSTEM AND METHOD OF USE

BACKGROUND

The present invention relates generally to automated inspection techniques and, more particularly, to automated and semi-automated visual inspection techniques using images, depth maps, sequences of images (videos), or sequences of depth maps (depth video) captured by image or depth capture devices such as borescopes.

Visual inspection devices, such as borescopes are routinely used to inspect components in difficult-to-reach locations of gas turbine engines, including, for example, turbine and combustor sections. Routine or periodic visual inspection allows a user to assess wear or degradation to components over a period of use to determine if repair or replacement of the component is required as well as to predict when repair or replacement may be necessary. Image sensors, such as borescopes, are often "snaked" into areas to assess damage. For this reason, viewing angles from one inspection event to the next and from one component to another are not standardized and, furthermore, are often oblique with respect to the area of damage. Borescopes can typically record images or video of internal components and structures, but generally do not perform automated analysis or data archiving. Automating borescope inspection has been an area of development, particularly for gas turbine manufacturers. Additional work has been done in the areas of remote inspection and depth-sensing borescope capabilities. Relatively little work has been conducted on human-machine-interactive (HMI) and archiving systems, which would allow a user to detect and quantify damage with absolute metrology and archive and assess data for trending and lifing of a component over a period of use or across a fleet of aircraft.

SUMMARY

In one aspect, a method of assessing damage to a component includes displaying a sensor image of the component in a first viewing pane, displaying a reference image of the component, which is a graphical depiction of the component with accurate dimensions, in a second viewing pane, placing a plurality of first identification markers on the sensor image of the component in the first viewing pane to correspond to a matching location with a second identification marker on the component in the reference image, identifying a region of damage on the component in the sensor image, mapping the region of damage to the component in the reference image using the plurality of first and second identification markers, and calculating a size of the region of damage.

In another aspect, a system for performing semi-automated damage detection and assessment includes a processor configured to receive and process data, a database for storing data, and a graphical user interface (GUI). The data includes sensor images and reference images of a plurality of components. The GUI includes two viewing panes. The first viewing pane includes a sensor image of a first component having a region of damage and a plurality of first identification markers positionable by a user within the first viewing pane. The second viewing pane includes a reference image of the first component, which is a graphical depiction of the component with accurate dimensions, a plurality of second identification markers positionable by a user within the second viewing pane, and a region indicator corresponding to a location of the region of damage of the sensor image. Each of the second identification markers is positioned to correspond to a first identification marker and pairs of corresponding first and second identification markers are positioned on the same location on the component. The region indicator delineates a size of the region of damage with absolute metrology on the reference image.

In yet another aspect, a graphical user interface includes a first viewing pane and a second viewing pane. The first viewing pane includes a sensor image of a first component having a region of damage and a plurality of first identification markers positionable by a user within the first viewing pane. The second viewing pane includes a reference image of the first component, wherein the reference image is a graphical depiction of the component with accurate dimensions, a plurality of second identification markers positionable by a user within the second viewing pane, and a region indicator corresponding to a location of the region of damage of the sensor image. Each of the second identification markers is positioned to correspond to a first identification marker and pairs of corresponding first and second identification markers are positioned on the same location on the component. The region indicator delineates a size of the region of damage with absolute metrology on the reference image.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A semi-automated damage detection and assessment system can be used to detect and quantify damage on a component with absolute metrology and archive and assess data for trending and lifing of the component over a period of use or across a fleet of equipment.

Figure 1:
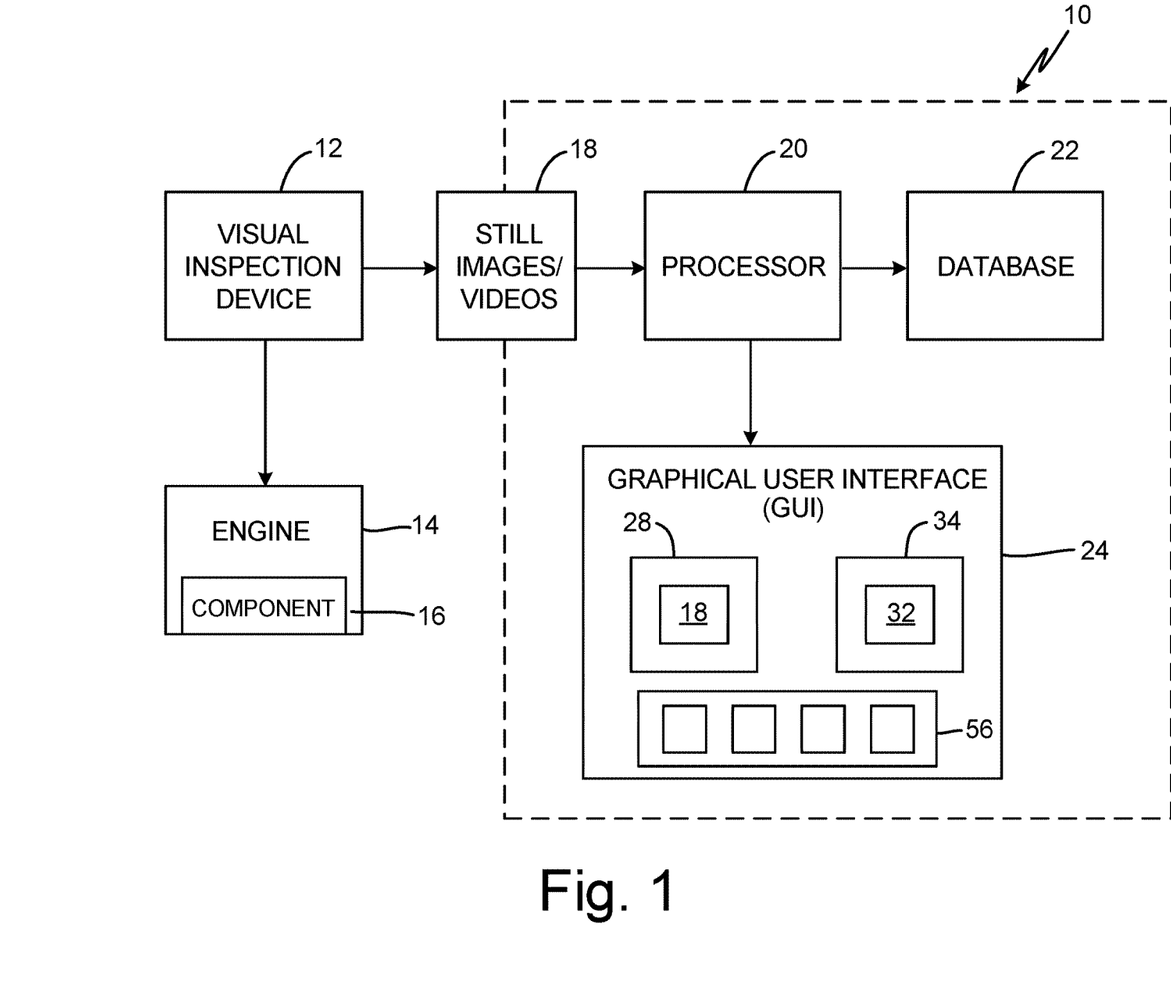
FIG. 1 is a schematic view of a semi-automated damage detection and assessment system.

FIG. 1 is a schematic illustration of semi-automated damage detection and assessment system 10. Damage assessment system 10 can be used in conjunction with visual inspection device 12 to periodically detect and assess damage to a component over time with absolute metrology. Damage assessment system 10 can also be used to assess damage to a component across a fleet of equipment in which the component is used. Visual inspection device 12 can be used to inspect difficult-to-reach locations in a wide variety of equipment or structures. As known in the art, visual inspection device 12 can be particularly useful in periodically assessing areas of a gas turbine engine 14 susceptible to damage due to thermal or mechanical stresses, including, for example, turbine and combustor components 16 (e.g., turbine blades, seals, combustor panels, etc.). Damage assessment system 10 can obtain images from visual inspection device 12, which damage assessment system 10, along with user input, can then process, evaluate, and archive for determining trending and lifing of a component. While the present disclosure is directed to inspection of components of gas turbine engines, it will be understood by one of ordinary skill in the art that visual inspection device 12 and damage assessment system 10 can find application in a wide variety of engines as well as other equipment and fields of study.

Visual inspection device 12 can be an optical device, imaging device, or image sensor capable of capturing and transmitting or storing still images, depth maps, sequences of images (video) and/or sequences of depth maps (depth video) 18 (also referred to herein as still images and/or videos), which can be provided to damage assessment system 10 for evaluation. Visual inspection device 12 can be a flexible or rigid borescope capable of accessing difficult-to-reach areas. Depending on the application, visual inspection device 12 can be required to "snake" through components or parts to access an area of damage. While operators can manually control the placement of visual inspection device 12, due to the flexibility of device 12 and/or accessibility of the component being inspected, operators can have difficulty positioning device 12 such that device 12 directly faces an area of damage. In many cases, visual inspection device 12 will obtain images and/or videos 18 of damage at an oblique angle, which can cause a region of damage to appear larger or smaller than it is in actuality. In addition, operators can have difficulty reproducing the positioning of device 12 from one inspection to the next. This can cause inaccuracies in damage assessment that compares current and previously collected images if the variation in viewing angle is not adequately corrected or compensated for. While image transform algorithms have been developed to account for variations in viewing angles and field-of-view, components having few or no identifying markers, such as a leading and trailing edges, tip, and platform of a blade, are not well-suited to an automated image transformation process. Combustor panels of gas turbine engines can fall into this category. The generally symmetric distribution of cooling holes can make it difficult to automatically identify reference points with a high level of confidence. This can be further complicated by variations in the viewing angle of a collected image and a reference model. While difficulties experienced in inspection of combustor panels have been a driver for development of the present invention, damage assessment system 10 can be used for a wide variety of components and structures.

Still images and/or videos 18 (also referred to herein as sensor images) obtained by visual inspection device 12 can be transmitted in real-time or post-inspection to damage assessment system 10. Damage assessment system 10 can be located at the site of inspection near the equipment being inspected or at a remote location. Damage assessment system 10 can include processor 20, which can be a computer with a central processing unit and memory; database 22, which can be internal to processor 20 or can be an external hard drive or data storage device; and graphical user interface (GUI) 24, which can display data (including still images and/or videos 18) on a computer screen as well as provide for user interaction with the data.

Figure 2:
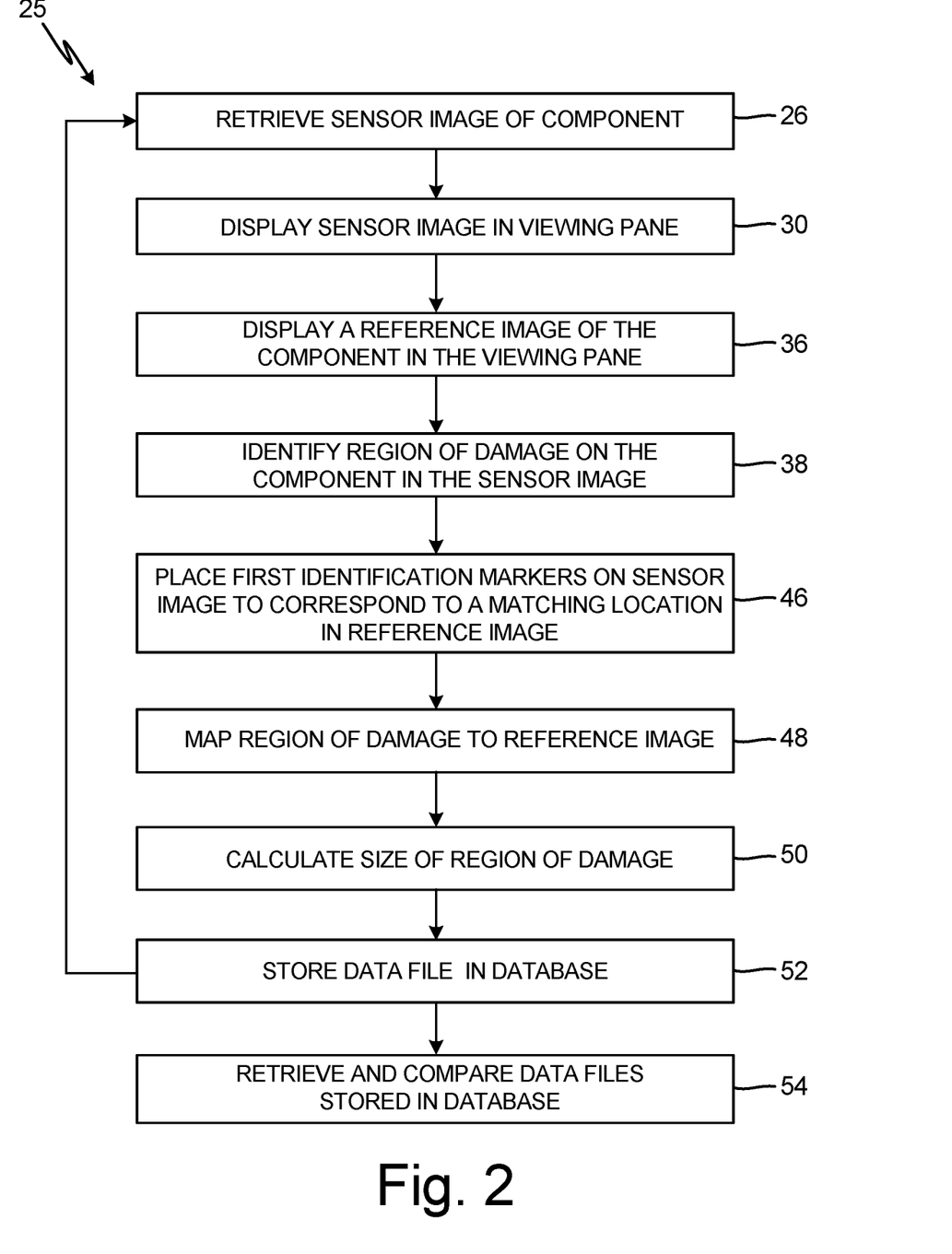
FIG. 2 is flow chart of a method of using the semi-automated damage detection and assessment system of FIG. 1.
Figure 3:
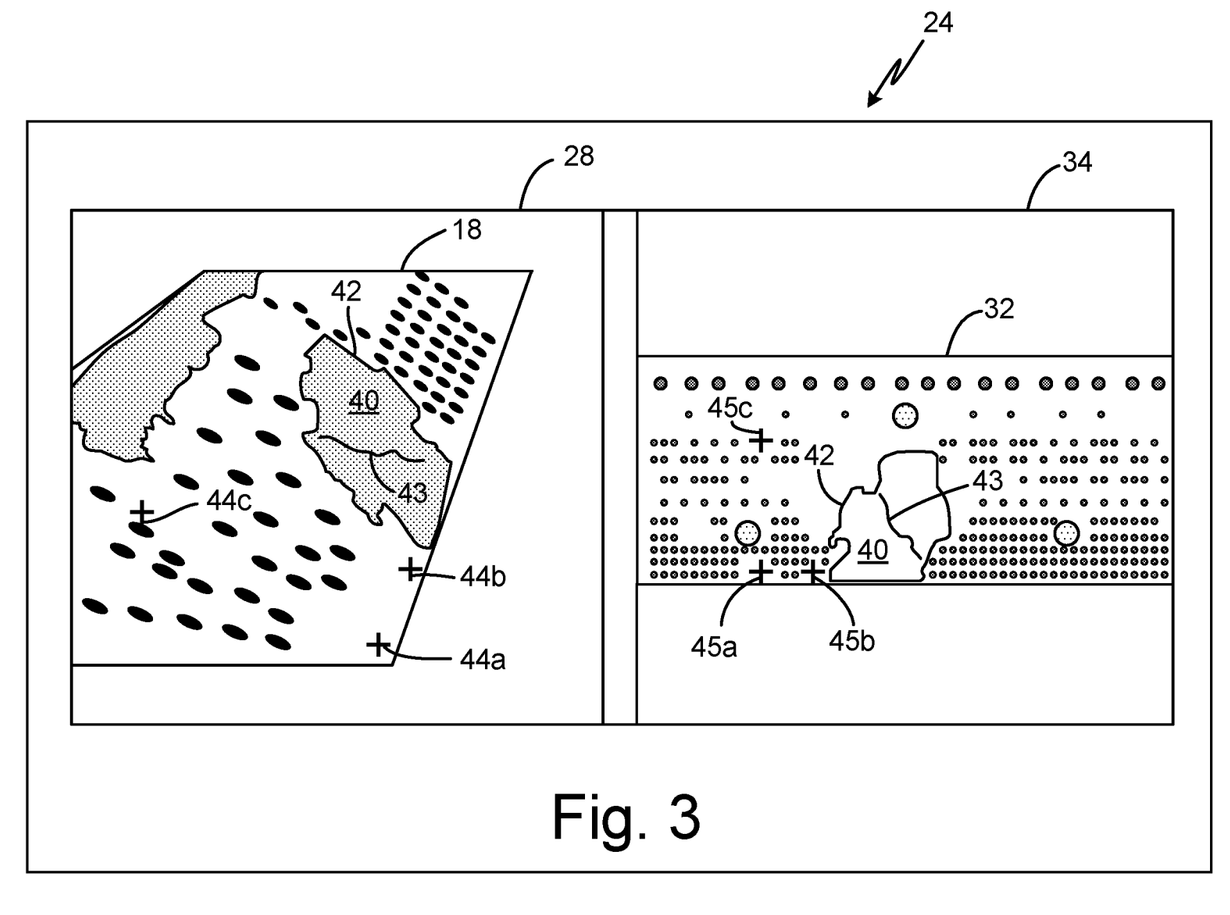
FIG. 3 is a simplified view of a graphical user interface for use with the method of FIG. 2.

FIG. 2 is a flow chart of a sample method 25 of using semi-automated damage detection and assessment system 10. FIG. 3 is a simplified screen view of one embodiment of GUI 24. FIGS. 2 and 3 are described together and with reference to FIG. 1. Still images and/or videos 18 can be retrieved from visual inspection device 12 or database 22 for damage detection and assessment in step 26. The user can load still images and/or videos 18 individually or can load an entire directory of still images and/or videos 18 to be viewed in viewing pane 28 (See FIGS. 1 and 3). A user can review still images and/or videos 18 in GUI 24 to identify regions of damage to the component being inspected. Alternatively, regions of damage can be identified during inspection and still images and/or video showing those regions can be transmitted to damage assessment system 10. The latter method can reduce the amount of data transmitted or provided to damage assessment system 10 by excluding extraneous images and/or videos. In step 30, still image (or video frame) 18 showing the region of damage can be selected by the user and displayed in viewing pane 28 of GUI 24 (shown in FIG. 3) for evaluation.

A reference image 32 of the component corresponding to the component shown in still image 18 in viewing pane 28 can be retrieved from database 22 and displayed in viewing pane 34 of GUI 24 (shown in FIG. 3) in step 36. Still image 18 can be displayed alongside reference image 32 in viewing panes 28 and 34 to allow the user to manipulate the still and references images 18 and 32 while viewing the images 18 and 32 simultaneously. The user can identify the component displayed in viewing pane 28 (e.g., outer diameter combustor panel no. 3) and retrieve the corresponding reference image 32 from database 22. Alternatively, the component can be identified during inspection and can be tagged to still image and/or video 18 and automatically retrieved. Even further, the component may be automatically identified by image classification techniques as taught elsewhere herein. As shown in FIG. 3, reference image 32 can be a 2D projection of a 3D CAD model, illustrated as a sketch or line drawing of the component. The 3D CAD model may be an as-designed CAD model, an as-built model, a previous condition model, or the like. The component illustrated in reference image 32 has a known size. While reference image 32 can be scaled to fit viewing pane 34, reference image 32 is dimensionally accurate such that measurements can be made on reference image 32 with absolute metrology.

In step 38, region of damage 40 (shown in FIG. 3) can be identified and delineated. Various types of damage, including, but not limited to cracks, delamination, and spallation, can be identified automatically by processor 18 using a classifier with deep learning trained from available data, such as a library of user characterized damage, statistical estimation algorithms, image or video classification algorithms, and the like. Deep learning is the process of training or adjusting the weights of a deep neural network. In the preferred embodiment the deep neural network is a deep convolutional neural network. Deep convolutional neural networks are trained by presenting an image or sub-image to an input layer and, possibly, a label, e.g., crack, spallation, burn-through, to an output layer. The training of a deep convolutional network proceeds layer-wise and does not require a label until the output layer is trained. The weights of the deep network's layers are adapted, typically by a stochastic gradient descent algorithm, to produce a correct classification. The deep learning training may use only partially labeled data, only fully labeled data, or only implicitly labeled data, or may use unlabeled data for initial or partial training with only a final training on labeled data. Statistical estimation or regression techniques are also applicable to determining if damage is present in the image Statistical estimation regression techniques can include principal components analysis (PCA), robust PCA (RPCA), support vector machines (SVM), linear discriminant analysis (LDA), expectation maximization (EM), Boosting, Dictionary Matching, maximum likelihood (ML) estimation, maximum a priori (MAP) estimation, least squares (LS) estimation, non-linear LS (NNLS) estimation, and Bayesian Estimation based on extracted features such as color, texture, size, edges, gradients, textures, generic features such as SIFT, SURF, ASIFT, other SIFT variants, corner detectors such as Harris, SUSAN, FAST, a Phase Correlation, a Normalized Cross-Correlation, BRIEF, CenSure /STAR, ORB, histograms of features such as HOG, HOOF, GLOH, and the like. Even further, general image or video classification algorithms may be used such as bag of visual words, clustering, and the like. Alternatively, the type of damage can be identified by a user by selecting from a pre-populated list of damage types in GUI 24. In some cases, one type of damage may overlay another (e.g., burn over spallation over crack as shown in FIG. 3). Each type of damage can be identified and delineated in still image 18 by the processor or the user. The outline of region of damage 40 can be delineated automatically by processor 18 using, for instance, active contour techniques, or other detection and classification techniques as taught elsewhere herein, or can be outlined by the user in GUI 24. Outline 42 can be drawn along a boundary of the region of damage 40. Multiple outlines 42 can be included in a single still image 18 to identify separate regions of damage 40 as well as distinguish different types of damage. For example, for linear damage, such as cracks, outline 42 can be line 43 indicating length as opposed to area. Outline 42 can be mapped to reference image 32 to be measured with absolute metrology as taught elsewhere herein.

Because the viewing angle of still image 18 does not necessarily match the viewing angle of reference image 32, image transformation is necessary to accurately map the region of damage 40 to reference image 32. Image transformation can be one of rigid transformation, affine transformation, or projective transformation to match the transformed still image 18 with reference image 32 using pairs of identification markers 44a-c and 45a-c (FIG. 3). Reference image 32 includes features of the component that can be visually observed, such as edges, cooling holes, dilution holes, etc. These features may or may not be visually observable in still image 18 depending on the viewing angle of visual inspection device 12, field-of-view, and the extent of damage to the component. Those features that are visually observable can be used as identification markers 44a-c to map the region(s) of damage 40 in still image 18 to reference image 32.

In step 46, the user can position identification markers 44a-c on still image 18 in viewing pane 28 to correspond to locations of identification markers 45a-c on reference image 32 in viewing pane 34. Pairs of identification markers 44a-c and 45a-c are positioned such that identification marker 44a-c in still image 18 corresponds to a unique identification marker 45a-c in reference image 32. Identification markers 45a-c in reference image 32 can be positioned by the user or can be predefined in reference image 32. Identification markers 45a-c generally identify landmarks that can be found in still image 18 with a high degree of certainty (e.g., edges, cooling holes, dilution holes, or regions immediately adjacent such features). Once identification markers 45a-c have been identified in reference image 32, the user can attempt to position identification markers 44a-c in corresponding locations in still image 18. Up to four pairs of identification markers 44a-c, 45a-c can be required to obtain an accurate image transformation, with each identification marker 44a-c, 45a-c separated from another identification marker 44a-c, 45a-c on the same image and the plurality of identification markers 44a-c, 45a-c being non-collinear. The number of pairs of corresponding identification markers 44a-c, 45a-c required depends on the type of transformation performed, e.g., rigid, affine, or projective transformation, which require two, three, and four pairs, respectively. Additional identification markers can improve accuracy of the image transformation, but may not be necessary. The user can modify the position of both identification markers 44a-c and 45a-c as necessary to accurately mark corresponding locations. It is recognized that some image transformations will lead to an undesired transformed image, which destroys the original relative orientation of the pairs of identification markers 44a-c, 45a-c. While the user will be able to recognize a poor transformation, processor 20 can also detect when a poor transformation is about to occur. Processor 20 can check whether the rigid constraint is satisfied by analyzing the direction of the turns from two vectors, which are respectively defined from a first reference marker 44a-c, 45a-c to a second reference marker 44a-c, 45a-c and from the second reference marker 44a-c, 45a-c to a third reference marker 44a-c, 45a-c. This method is further described in Monnin et al. (2010), "An Effective Rigidity Constraint for Improving RANSAC in Homography Estimation," in Blanc et al., (eds) Advanced Concepts for Intelligent Vision Systems, ACIVS 2010, pp. 203-214. If processor 20 detects poor transformation, GUI 24 can prompt the user to improve the corresponding accuracy of identification markers 44a-c, 45a-c and/or identify additional pairs of corresponding identification markers 44a-c, 45a-c before the transformation is applied to reference image 32. Processor 20 can automatically rotate and zoom still image 18 to approximate an orientation of reference image 32, which can aid in the positioning of identification markers 44a-c. Additionally, the user can rotate and zoom still image 18.

Once the user has appropriately positioned identification markers 44a-c and 45a-c, still image 18 or the region of damage 40, as identified by outline 42, can be transformed or mapped to reference image 32 (step 48). Once the region of damage 40 is mapped to reference image 32, the size or area of the region of damage 40 can be measured with absolute metrology (i.e., in standards units of measure) in step 50. The quantification of predominantly linear damage (e.g., cracks), may employ erosion, dilation, connected component, and skeletonization techniques to produce a single line or connected set of lines along the damage where pixel count along the line or lines is used to calculate the damage length. For predominantly area damage, such as spallation, the area may be calculated by Gauss's area formula (also known as the shoelace formula or surveyor's formula).

Being able to determine the exact size of the region of damage 40 is critical not only for assessing the actual extent of damage at the time of inspection, but for assessing changes in the extent of damage over a period of operation. The transformed images, reference images 32 depicting the region of damage 40, and/or locations and measurements of damage 40 can be stored in database 22 in step 52. Each time the component is inspected, the process (step 26 through step 52) is repeated and a new reference image 32 depicting a new or altered region of damage can be stored in database 22. In this manner, database 22 can be populated with a history of the region of damage 40, which can include both still images 18 and reference images 32 depicting the region of damage 40 for each inspection event. GUI 24 can provide user with the ability to retrieve previously stored data (step 55) and observe the change in the region of damage 40 over a period of operation. Such data can be presented graphically (i.e., drawing depicting the region of damage 40 at each inspection event) or numerically (i.e., table providing the size and type of the region of damage 40 at each inspection event) in another viewing pane 56 (FIG. 1). This can allow the user to accurately assess changes in damage, which can help the user predict when the component will require repair or replacement.

In addition to assessing damage to a component over time, the user can identify trends in damage for the particular component across a fleet of equipment. Damage assessment system 10 allows the user retrieve, display, and assess data stored for the same component on different equipment, e.g., on different engines within a fleet of aircraft. This data can also be displayed graphically or numerically in viewing pane 56. Furthermore, the user is able to compare similar components, such as inner and outer diameter or forward and aft combustor panels, adjacent turbine blades, or blades in different stages of a turbine.

Although the steps above have been discussed in a specific order, it is understood that some of the steps could be performed in a different order or omitted entirely if desired. For example, the placement of first identification markers (FIG. 2, step 46) could happen before or after identification of damage (FIG. 2, step 38).

Referring now specifically to FIG. 3, GUI 24 provides the user with the ability to review still images, videos, depth maps, and/or depth videos of a component to identify regions of damage 40 and to map those regions of damage 40 to the corresponding reference image 32 with absolute metrology using user-positionable reference markers 44*a-c*, 45*a-c*. GUI 24 improves user efficiency and accuracy by including a slider control or mouse wheel and forward/backward key functionality (not shown) for both rapid forward and backward scrolling and single-stepping through a sequence of image or depth maps 18, and both rapid and single-step zooming in/out of component image 18 or reference image 32. GUI 24 additionally allows the user to delineate points, lines, and areas by mouse, pen, or touchscreen input; effect and confirm a transform; add metadata and tags by menu selection and/or keyboard input; invoke or preclude automated processing and disposition automated processing results including editing shapes; checkpoint an inspection to save work in progress, restore work in progress from a checkpoint; and archive inspection results.

Damage assessment system 10 provides for semi-automated damage detection and image transformation to provide damage quantification with absolute metrology. The data provided by damage assessment system 10 can be archived for trending and lifing assessment of components susceptible to damage during operation with a high degree of confidence.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method of assessing damage to a component includes displaying a sensor image of the component in a first viewing pane, displaying a reference image of the component, which is a graphical depiction of the component with accurate dimensions, in a second viewing pane, placing a plurality of first identification markers on the sensor image of the component in the first viewing pane to correspond to a matching location with a second identification marker on the component in the reference image, identifying a region of damage on the component in the sensor image, mapping the region of damage to the component in the reference image using the plurality of first and second identification markers, and calculating a size of the region of damage.

The method of the preceding paragraph can optionally include, additionally and/or alternatively, any one or more of the following steps, features, configurations and/or additional components:

The method of the preceding paragraph can further include identifying a type of damage in the region of damage in the sensor image.

The method of any of the preceding paragraphs can further include storing at least one data file to a database, wherein the data file is selected from the group consisting of the sensor image, the mapped region of damage, and the calculated size of the region of damage.

The method of any of the preceding paragraphs can further include repeating preceding steps for each of a plurality of sensor images of the component, wherein each sensor image provides a view of the component at a different date of operation, and storing a plurality of data files to the database, wherein the plurality of data files is selected from the group consisting of the plurality of sensor images, the plurality of mapped regions of damage, and the plurality of calculated sizes of the region of damage.

The method of the preceding paragraphs can further include retrieving previously stored data files from the database, wherein the previously stored data files are selected from the group consisting of the plurality of sensor images, the plurality of mapped regions of damage, and the plurality of calculated sizes of the region of damage, and displaying a history of the region of damage for the component.

The method of any of the preceding paragraphs can further include repeating the preceding steps 1 for each of a plurality of sensor images of components of the same type operating in different assemblies, wherein each sensor image provides a view of a component obtained from a different assembly, and storing a plurality of data files to the database, wherein the plurality of data files is selected from the group consisting of the plurality of sensor images, the plurality of mapped regions of damage, and the plurality of calculated sizes of the region of damage.

The method of the preceding paragraph can further include retrieving previously stored data files from the database, wherein the previously stored data files are selected from the group consisting of the plurality of sensor images, the plurality of mapped regions of damage, and the plurality of calculated sizes of the region of damage, and displaying the previously stored data to compare the region of damage between the components operating in different assemblies.

A system for performing semi-automated damage detection and assessment includes a processor configured to receive and process data, a database for storing data, and a graphical user interface (GUI). The data includes sensor images and reference images of a plurality of components. The GUI includes two viewing panes. The first viewing pane includes a sensor image of a first component having a region of damage and a plurality of first identification markers positionable by a user within the first viewing pane. The second viewing pane includes a reference image of the first component, which is a graphical depiction of the component with accurate dimensions, a plurality of second identification markers positionable by a user within the second viewing pane, and a region indicator corresponding to a location of the region of damage of the sensor image. Each of the second identification markers is positioned to correspond to a first identification marker and pairs of corresponding first and second identification markers are positioned on the same location on the component. The region indicator delineates a size of the region of damage with absolute metrology on the reference image.

The system of the preceding paragraph can optionally include, additionally and/or alternatively, any one or more of the following features, configurations and/or additional components:

The system of the preceding paragraph, wherein the reference image can be a two-dimensional projection of a three-dimensional CAD model of the component.

The system of any of the preceding paragraphs, wherein the region of damage can be automatically identified and delineated by the processor.

The system of any of the preceding paragraphs, wherein a viewing angle of the first component in the sensor image can be different than a viewing angle of the first component in the reference image.

The system of any of the preceding paragraphs, wherein the region of damage in the first viewing pane can be mapped by transformation from the sensor image to the reference image using the first and second identification markers.

The system of any of the preceding paragraphs, wherein the processor is capable of detecting when a poor transformation is about to occur and can prompt the user to reposition one or more of the first or second identification markers to improve transformation.

The system of any of the preceding paragraphs, wherein the region of damage can be classified according to a type of damage present, wherein classification can be performed automatically by the processor or performed manually by a user by selecting from a pre-populated menu of damage types.

The system of any of the preceding paragraphs, wherein at least one data file can be saved to the database, wherein the at least one data file is selected from the group consisting of the sensor image, the mapped region of damage, and the calculated size of the region of damage, and the type of damage.

The system of any of the preceding paragraphs, wherein the database can include a plurality of data files collected over a period of time during which the first component was susceptible to damage by damage-causing elements, wherein the plurality of data files is selected from the group consisting of a plurality of sensor images, a plurality of mapped regions of damage, a plurality of calculated sizes of the region of damage, and a plurality of the types of damage.

The system of any of the preceding paragraphs can further include a third viewing pane comprising aggregate information from the plurality of data files to provide a history of the region of damage.

The system of any of the preceding paragraphs, wherein the database can include a plurality of data files collected for a plurality of first components operating in different assemblies, wherein the plurality of data files is selected from the group consisting of a plurality of sensor images, a plurality of mapped regions of damage, a plurality of calculated sizes of the region of damage, and a plurality of the types of damage.

The system of any of the preceding paragraphs can further include a third viewing pane comprising aggregate information from the plurality of data files to compare the region of damage between the plurality of first components.

A graphical user interface includes a first viewing pane and a second viewing pane. The first viewing pane includes a sensor image of a first component having a region of damage and a plurality of first identification markers positionable by a user within the first viewing pane. The second viewing pane includes a reference image of the first component, wherein the reference image is a graphical depiction of the component with accurate dimensions, a plurality of second identification markers positionable by a user within the second viewing pane, and a region indicator corresponding to a location of the region of damage of the sensor image. Each of the second identification markers is positioned to correspond to a first identification marker and pairs of corresponding first and second identification markers are positioned on the same location on the component. The region indicator delineates a size of the region of damage with absolute metrology on the reference image.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of assessing damage to a component, the method comprising:
    displaying a sensor image of the component in a first viewing pane;
    displaying a reference image of the component in a second viewing pane, wherein the reference image is a graphical depiction of the component with accurate dimensions;
    placing a plurality of first identification markers on the sensor image of the component in the first viewing pane, wherein each of the first identification markers corresponds to a matching location with a second identification marker on the component in the reference image;
identifying a region of damage on the component in the sensor image;
mapping the region of damage on the sensor image of the component to the reference image using the plurality of first and second identification markers, wherein mapping the region of damage is performed by a processor using image transformation;
evaluating, with the processor, whether a poor transformation is about to occur; and
responding to an evaluation that a poor transformation is about to occur by prompting the user to reposition one or more of the first or second identification markers to improve transformation;
calculating a size of the region of damage.

2. The method of claim 1 and further comprising:
identifying a type of damage in the region of damage in the sensor image.

3. The method of claim 1 and further comprising:
storing at least one data file to a database, wherein the data file is selected from the group consisting of the sensor image, the mapped region of damage, and the calculated size of the region of damage.

4. The method of claim 3 and further comprising:
repeating the steps of claim 1 for each of a plurality of sensor images of the component, wherein each sensor image provides a view of the component at a different date of operation; and
storing a plurality of data files to the database, wherein the plurality of data files is selected from the group consisting of the plurality of sensor images, the plurality of mapped regions of damage, and the plurality of calculated sizes of the region of damage.

5. The method of claim 4 and further comprising:
retrieving previously stored data files from the database, wherein the previously stored data files are selected from the group consisting of the plurality of sensor images, the plurality of mapped regions of damage, and the plurality of calculated sizes of the region of damage; and
displaying a history of the region of damage for the component.

6. The method of claim 3 and further comprising:
repeating the steps of claim 1 for each of a plurality of sensor images of components of the same type operating in different assemblies, wherein each sensor image provides a view of a component obtained from a different assembly; and
storing a plurality of data files to the database, wherein the plurality of data files is selected from the group consisting of the plurality of sensor images, the plurality of mapped regions of damage, and the plurality of calculated sizes of the region of damage.

7. The method of claim 6 and further comprising:
retrieving previously stored data files from the database, wherein the previously stored data files are selected from the group consisting of the plurality of sensor images, the plurality of mapped regions of damage, and the plurality of calculated sizes of the region of damage; and
displaying the previously stored data to compare the region of damage between the components operating in different assemblies.

8. A system for performing semi-automated damage detection and assessment, the system comprising:
a processor configured to receive and process data;
a database for storing data, wherein data comprises sensor images and reference images of a plurality of components;
a graphical user interface comprising:
a first viewing pane comprising:
a sensor image of a first component in a first orientation and having a region of damage; and
a plurality of first identification markers positionable by a user within the first viewing pane; and
a second viewing pane comprising:
a reference image of the first component, wherein the reference image is a graphical depiction of the component with accurate dimensions and is in a second orientation different than the first orientation;
a plurality of second identification markers positionable by a user within the second viewing pane;
wherein each of the second identification markers is positioned to correspond to a first identification marker and wherein pairs of corresponding first and second identification markers are positioned on the same location on the component; and
a region indicator corresponding to a location of the region of damage of the sensor image, wherein the region indicator delineates a size of the region of damage with absolute metrology on the reference image;
wherein the processor is capable of detecting when a poor transformation is about to occur and prompting the user to reposition one or more of the first or second identification markers to improve transformation.

9. The system of claim 8, wherein the reference image is a two-dimensional projection of a three-dimensional CAD model of the component.

10. The system of claim 8, wherein the region of damage is automatically identified and delineated by the processor.

11. The system of claim 8, wherein a viewing angle of the first component in the sensor image is different than a viewing angle of the first component in the reference image.

12. The system of claim 8, wherein the region of damage in the first viewing pane is mapped by transformation from the sensor image to the reference image using the first and second identification markers.

13. The system of claim 8, wherein the region of damage is classified according to a type of damage present, wherein classification is performed automatically by the processor or performed manually by a user by selecting from a pre-populated menu of damage types.

14. The system of claim 13, wherein at least one data file is saved to the database, wherein the at least one data file is selected from the group consisting of the sensor image, the mapped region of damage, and the calculated size of the region of damage, and the type of damage.

15. The system of claim 14, wherein the database comprises a plurality of data files collected over a period of time during which the first component was susceptible to damage by damage-causing elements, wherein the plurality of data files is selected from the group consisting of a plurality of sensor images, a plurality of mapped regions of damage, a plurality of calculated sizes of the region of damage, and a plurality of the types of damage.

16. The system of claim 15 and further comprising:
a third viewing pane comprising aggregate information from the plurality of data files to provide a history of the region of damage.

17. The system of claim 14, wherein the database comprises a plurality of data files collected for a plurality of first components operating in different assemblies, wherein the plurality of data files is selected from the group consisting of a plurality of sensor images, a plurality of mapped regions of damage, a plurality of calculated sizes of the region of damage, and a plurality of the types of damage.

18. The system of claim 17 and further comprising:
 a third viewing pane comprising aggregate information from the plurality of data files to compare the region of damage between the plurality of first components.

* * * * *